US006253249B1

(12) United States Patent
Belzile (10) Patent No.: US 6,253,249 B1
(45) Date of Patent: Jun. 26, 2001

(54) METHOD AND DEVICES FOR BRIDGING DATA AND TELEPHONE NETWORKS

(75) Inventor: Pierre Belzile, Lachine (CA)

(73) Assignee: Nortel Networks Limited, Montreal (CA)

( * ) Notice: Subject to any disclaimer, the term of this patent is extended or adjusted under 35 U.S.C. 154(b) by 0 days.

(21) Appl. No.: 09/144,110

(22) Filed: Aug. 31, 1998

(51) Int. Cl.$^7$ ............... G06F 15/16; H04B 1/38; H04L 12/16

(52) U.S. Cl. ............ 709/249; 709/250; 455/557; 455/428; 370/259; 370/28.5

(58) Field of Search ............... 709/249, 250; 370/259, 285; 455/557, 428

(56) References Cited

U.S. PATENT DOCUMENTS

| 4,644,468 | * | 2/1987 | Doster et al. | 709/220 |
|---|---|---|---|---|
| 4,771,425 | | 9/1988 | Baran et al. | 370/85 |
| 4,969,184 | | 11/1990 | Gordon et al. | 379/100 |

(List continued on next page.)

FOREIGN PATENT DOCUMENTS

| 56456/94 | 7/1996 | (AU) . |
|---|---|---|
| 2110711 | 1/1993 | (CA) . |
| 2197204 | 2/1996 | (CA) . |
| 2167215 | 7/1997 | (CA) . |
| 0 732835 A2 | 9/1996 | (EP) . |
| WO 94/24803 | 10/1994 | (WO) . |
| WO 95/18501 | 7/1995 | (WO) . |
| WO 96/05684 | 2/1996 | (WO) . |
| WO 96/09714 | 3/1996 | (WO) . |
| WO 96/38018 | 11/1996 | (WO) . |
| WO 97/20424 | 6/1997 | (WO) . |
| WO 97/26749 | 7/1997 | (WO) . |
| WO 97/35416 | 9/1997 | (WO) . |
| WO 97/37483 | 10/1997 | (WO) . |
| WO 97/47118 | 12/1997 | (WO) . |
| WO 98/01985 | 1/1998 | (WO) . |
| WO 98/07266 | 2/1998 | (WO) . |

OTHER PUBLICATIONS

Baran, P., "On Distributed Communications Networks", IEEE Transactions on Communications, (Mar. 1964), pp. 1–9.

Shankar, U. and C. Lai, "Interworking Between Access Protocol and Network Protocol for Interswitch ISDN Services", TENCON '89, Bombay, India, Nov. 1989.

Casner, et al., "RFC14ZZ: Integrated Service in the Internet Architecture", Sep., 1993.

(List continued on next page.)

Primary Examiner—Krisna Lim (57) ABSTRACT

A data network to telephone network gateway (16) and an end-user computing device and method used by these devices are disclosed (26). The gateway (16) is in communication with both a data network (10) and a telephone network (12). The computing device (26) is in communication with the data network (10). The gateway (16) is adapted to receive an indicator of a telephone call and dispatch a notification of the call destined for the computing device (26). As well, the gateway (16) causes the call to be bridged from the telephone network to the computing device over the data network (10), enabling a user at the computing device (26) to communicate with the call using the computing device (26). After the call is bridged, and in response to a specified condition, the gateway (16) causes the call to be forwarded to a telephone line (34) interconnected with the telephone network. The specified condition may include an end-user input, or a detection by the gateway or the computing device that the quality of the bridged call has fallen below an acceptable standard, arising typically from congestion or delays on the data network (10). This allows the end-user to maintain a high quality call connection.

32 Claims, 8 Drawing Sheets

U.S. PATENT DOCUMENTS

| | | | |
|---|---|---|---|
| 4,995,074 | | 2/1991 | Goldman et al. ................ 379/97 |
| 5,363,431 | | 11/1994 | Schull et al. ................... 379/67 |
| 5,434,906 | | 7/1995 | Robinson ....................... 379/67 |
| 5,533,110 | | 7/1996 | Pinard et al. .................. 379/201 |
| 5,557,105 | | 9/1996 | Baum et al. ................... 379/93 |
| 5,604,737 | | 2/1997 | Iwami et al. .................. 370/352 |
| 5,608,786 | | 3/1997 | Gordon ......................... 379/100 |
| 5,610,910 | | 3/1997 | Foscaneanu et al. ........... 370/351 |
| 5,625,676 | | 4/1997 | Greco et al. ................... 379/88 |
| 5,805,587 | | 9/1998 | Norris et al. .................. 370/352 |
| 5,999,965 | * | 12/1999 | Kelly ............................ 709/202 |
| 6,026,296 | * | 2/2000 | Sanders, III et al. ........... 455/426 |
| 6,138,011 | * | 10/2000 | Sanders, III et al. ........... 455/426 |
| 6,144,667 | * | 11/2000 | Doshi et al. ................... 370/401 |

OTHER PUBLICATIONS

Clark, D.D., S. Shenker and L. Zhang, "Supporting Real–Time Applications in an Integrated Services Packet Network: Architecture and Mechanism", SIGCOMM92, Aug. 1992.

Yang, C., "RFC1789: INETPhone: Telephone Services and Servers on Internet", Network Working Group, Apr. 1995.

Braden et al., "RFC 1633:Integrated Services in the Internet Architecture: an Overview", Network Working Group, Jun. 1994.

Burson, A.F. and A.D. Baker, "Optimizing Communications Solutions", IEEE Communications Magazine, 31(1), (Jan. 1993), pp. 15–19.

"Workstation Communications System", IBM Technical Disclosure Bulletin, 37(9), (Sep. 1994), pp. 101–104.

Babbage, R.I. Moffat, A. O'Neill and S. Sivaraj, "Internet Phone—Changing the Telephony Paradigm?", BT Technology Journal, 15(2) (Apr. 1997), pp. 145–157.

Hansson, A., R. Nedjeral and I. Tonnby, "Phone Doubler—A Step Towards Integrated Internet and Telephone Communities", Ericsson Review 4 (1997), pp. 142–151.

"Here It Comes—the Phone Doubler", Ericsson Connexion, (Jun. 1997), p. 47.

"Internet and Ericsson", Ericsson Connexion, (Dec. 1996), pp. 46–47.

Low, C., "The Internet Telephony Red Herring", Hewlett Packard, Laboratories Tech. Report, May 15, 1996, pp.1–15.

CMP Publications, Inc., Masud, Sam, "Product Supports Voice on Net", Apr. 7, 1997, p. 1–2.

Business Wire, Inc., "Ericsson Product Allows Simultaneous Voice and Internet Connections Over One Phone Line", Mar. 11, 1997, pp. 1–2.

Business Wire, Inc., "Ericsson's New Phone Doubler Combines Voice and Internet Over a Single Telephone Line", Mar. 10, 1997, pp. 1–2.

* cited by examiner

METHOD AND DEVICES FOR BRIDGING DATA AND TELEPHONE NETWORKS

FIELD OF THE INVENTION

The present invention relates to networked computing devices, and more particularly to a method and devices for bridging data and telephone networks.

BACKGROUND OF THE INVENTION

Traditionally, telephone calls have been routed through the public switched telephone network ("PSTN") to interconnect subscribers wishing to speak with each other.

More recently, data networks have become commonly used to exchange data between interconnected computing devices. The best known example of such a network is the public internet.

In the presence of a data network and the PSTN, the desire to bridge traffic on one network to the other has been recognized, For example, the PSTN is often used to provide access to the data network.

Similarly, the use of a data network to carry voice traffic has also been recognized. Accordingly, computer applications that allow end-users to establish voice connections using a data network are known.

Additionally, the use of a data network to transparently carry calls between end-users on the PSTN is also known. This is often done to avoid toll charges associated with the PSTN.

Finally, the bridging of calls originating with a caller on the telephone network and an end-user at a data network has also been recognized. This form of bridging is often performed as a matter of convenience, and is often used when a telephone connection is not available to the end-user resulting, for example, from the end-user's use of the telephone line to establish a connection to the data network.

Devices used for this latter form of bridging are, for example, disclosed in PCT patent publication no. WO 97/20424. However, such bridging assumes that the data network offers sufficient capacity in order to carry call data. In reality, a data network, such as the public internet is often congested and therefore cannot adequately be used to carry voice traffic.

Accordingly, it would be desirable to provide a method and devices for bridging calls across networks that allow users to the flexibility of maintaining high quality call connections.

SUMMARY OF THE INVENTION

In accordance with an aspect of the present invention there is provided a method of providing a telephone call from a telephone network to a user proximate a computing device interconnected with a data network, the method comprising the steps of: a) receiving an indicator of the call at a gateway in communication with the data network and the telephone network; dispatching a notification of the call from the gateway for the computing device; c) bridging the call from the telephone network to the computing device using the data network, to form a bridged call that enables the user to communicate with the call using the computing device; and d) in response to a specified condition, forwarding the call to a telephone line interconnected with the telephone network, after step c).

In accordance with another aspect of the present invention there is provided a telephone network to data network gateway comprising: a processor; a telephone network interface in communication with the processor and the telephone network; a data network interface in communication with the processor and the data network; persistent storage memory in communication with the processor, the persistent storage memory storing processor executable instructions adapting the gateway to: a) receive a telephone network call at the telephone network interface; b) dispatch a notification of the call from the data network interface to a computing device over the data network; c) cause the call to be bridged from the telephone network to the computing device using the data network, to form a bridged call enabling a user at the computing device to communicate with the call using the computing device; and d) in response to a specified condition, cause the call to be forwarded to a telephone line interconnected with the telephone network, after the call has been bridged.

In accordance with a further aspect of the present invention there is provided a method of operating an end-user computing device interconnected with a data network, the method comprising the steps of: a) receiving an indicator of an incoming call at a telephone network over the data network; b) communicating with the call at the telephone network by way of the data network using a voice telephony application; and c) in response to a specified condition, notifying the gateway to forward the call to a telephone line interconnected with the telephone network, after step b)

In accordance with yet a further aspect of the present invention there is provided a computing device comprising: a processor; a data network interface in communication with the processor and the data network; persistent storage memory in communication with the processor, the persistent storage memory comprising processor readable instructions adapting the device to: a) receive a notification of a call at the telephone network, at the data network interface; b) communicate with the call at the telephone network by way of the data network using a voice telephony application; and c) in response to a specified condition, transmit an indicator to the gateway to transfer the call to a telephone interconnected with the telephone network, after communications with the call.

In accordance with another aspect of the present invention there is provided a data network to telephone network gateway comprising: a) means for receiving an indicator of the call at a gateway in communication with the data network and the telephone network; b) means for dispatching a notification of the call from the gateway for the computing device; c) means for bridging the call from the telephone network to the computing device using the data network, to form a bridged call that enables the user to communicate with the call using the computing device; and d) means for forwarding the call to a telephone line interconnected with the telephone network in response to a specified condition.

In accordance with another aspect of the present invention there is provided a computer readable medium storing computer software that when loaded by a gateway comprising a telephone network interface, adapts the gateway to: a) receive an indicator of the call at the gateway computer at the telephone network adaptor; b) dispatch a notification of the call from the gateway computer for a computing device interconnected with a data network; c) cause the call to be bridged from the telephone network to the computing device using the data network, to form a bridged call that enables a user at the computing device to communicate with the call using the computing device; and d) in response to a specified condition, cause the call to be forwarded to a telephone line interconnected with the telephone network, after causing the call to be bridged.

In accordance with another aspect of the present invention there is provided a method of processing a call comprising the steps of: a) bridging the call between a telephone network and a computing device in communication with a data network, at a gateway in communication with the data network and the telephone network, to form a bridged call that enables a user to communicate with the call using the computing device; and b) in response to a specified condition, forwarding the call to a telephone line interconnected with the telephone network, after step a)

BRIEF DESCRIPTION OF THE DRAWING

In figures which illustrate, by way of example, embodiments of the present invention.

DETAILED DESCRIPTION

Figure 1:
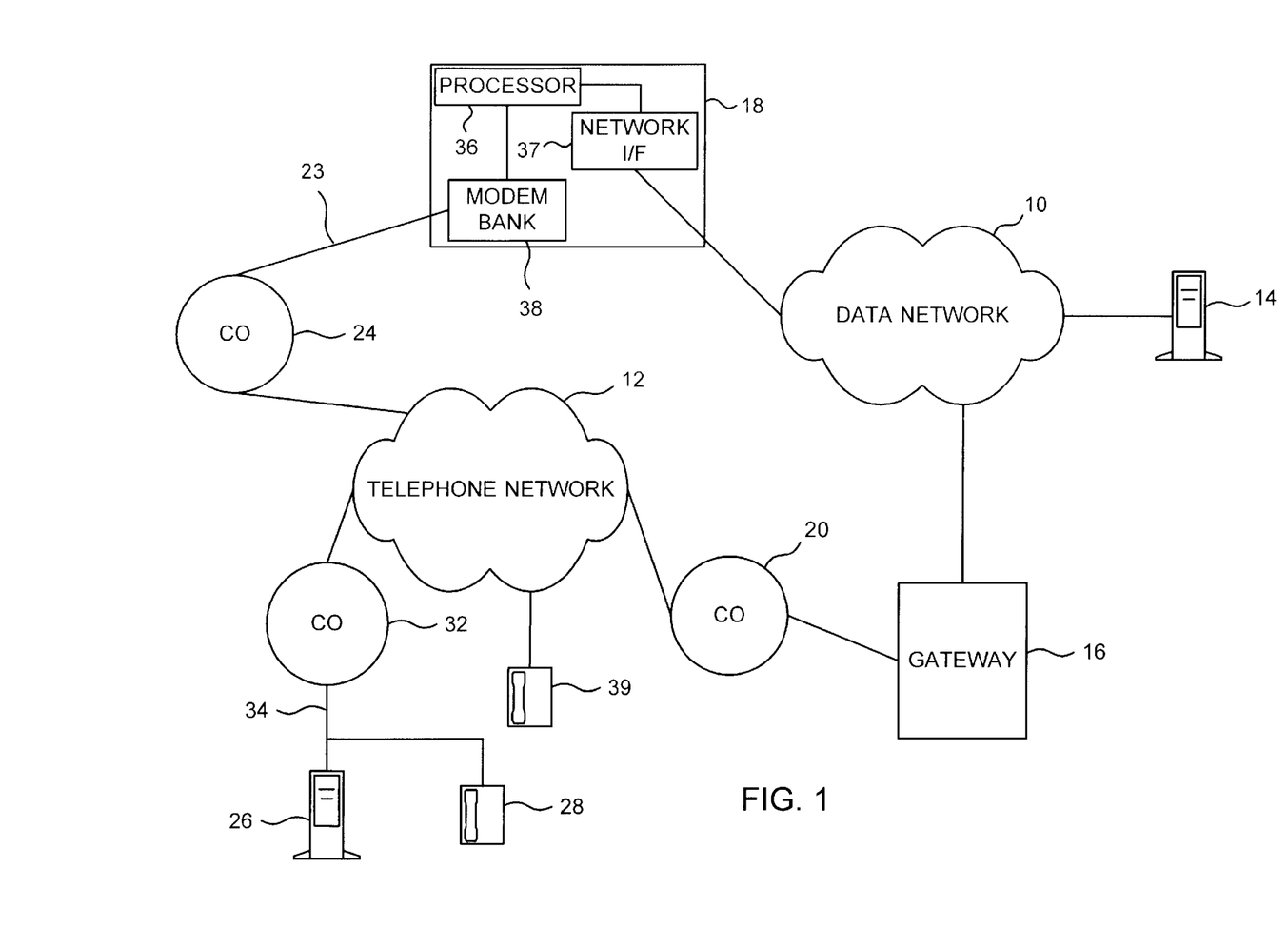
FIG. 1 illustrates a plurality of interconnected computing devices, including a data network to telephone network gateway and an end-user computing device, exemplary of embodiments of the present invention.

FIG. 1 illustrates a plurality of computing devices 14, 16, 18 and 26 interconnected to each other by way of data network 10. Network 10 is preferably a packet switched data network, and is preferably the public internet, using the internet protocol ("IP"), as detailed in RFC 791 to exchange data in the form of packets between interconnected computing devices, such as computing devices 14, 16, 18 and 26. Network 10 may, for example, be the public internet, a private internet, or another suitable local or, wide area network.

Each computing device 14, 16, 18 or 26 may be a network server, used to serve files such as data, applications, or an end-user workstation or terminal that makes use of other network resources. In the illustrated example, devices 14 and 26 are end-user work stations; device 18 is an internet service provider server ("ISP"); and device 16 is a message server and data network to telephone network gateway, exemplary of an embodiment of the present invention.

Devices 14, 16, 18 and 26 may be interconnected with network 10 in any of a number of ways. For example, device 14 may be directly interconnected with an internet router using an Ethernet or other physical interface. Device 26 may be connected to network 10 through the PSTN 12. Similarly, devices 16 and 18 could be connected to network 10, by an asynchronous transfer mode ("ATM") switch (not illustrated); an integrated standards digital network ("ISDN") (not illustrated); a local area network (not illustrated); or any other suitable physical connection to network 10.

Device 26, ISP 18 and gateway 16 are further interconnected with a telephone network, which, in the example embodiment network is the public switched telephone network ("PSTN") 12. An additional example PSTN subscriber 39 is also illustrated.

As illustrated, computing device 26 may be connected with network 10 through ISP 18 by way of the PSTN 12. As noted, device 26 is an end-user workstation. A conventional telephone modem preferably forms part of computing device 26. The modem is interconnected with PSTN 12 using a conventional telephone line 34 to central office switch ("CO") 32, forming part of the PSTN 12. Telephone line 34 is also used to provide service to telephone 28 when line 34 is otherwise not in use. Connection of computing device 26 to network 10 is typically not permanent, but instead is initiated over PSTN 12 for sessions of varying duration.

ISP 18 comprises a processor 36 in communication with a bank of modems 38 interconnected to PSTN 12 through trunk 23 to CO 24 and a network interface 37, such as a T1 data interface, Ethernet interface, or the like, connecting ISP 18 to network 10. ISP 18 provides subscribers with internet access through the PSTN 12. Subscribers gain access to network 10 by dialing a PSTN dial number ("DN") identifying trunk 23 and interconnected to modem bank 38 and establishing an IP session using conventional software at ISP 18, as detailed below. Modem bank 38 comprises a plurality of modems, typically interconnected with individual telephone lines all forming part of trunk 23 assigned to a single DN so that multiple calls to the DN assigned to the ISP 18 are directed to different modems within modem bank 38.

Gateway 16, on the other hand, is a message server and telephone network to data network gateway, that is interconnected to network 10 using any one of a number of known physical connections. Gateway 16 is adapted to provide an internet service at almost all times. As such, connection of gateway 16 to network 10 is typically not intermittent and is instead permanent. Gateway 16 is preferably connected with network 10 using dedicated a T1 or fractional T1 interface. Gateway 16 is further interconnected with the PSTN 12, through CO 20, as illustrated. As will become apparent, gateway 16 is preferably adapted to provide a service such as the internet call waiting service, as for example disclosed in U.S. patent application Ser. No. 08/911,036 the contents of which are hereby incorporated herein by reference. Gateway 16 is further adapted to bridge calls between network 10 and PSTN 12.

Figure 2:
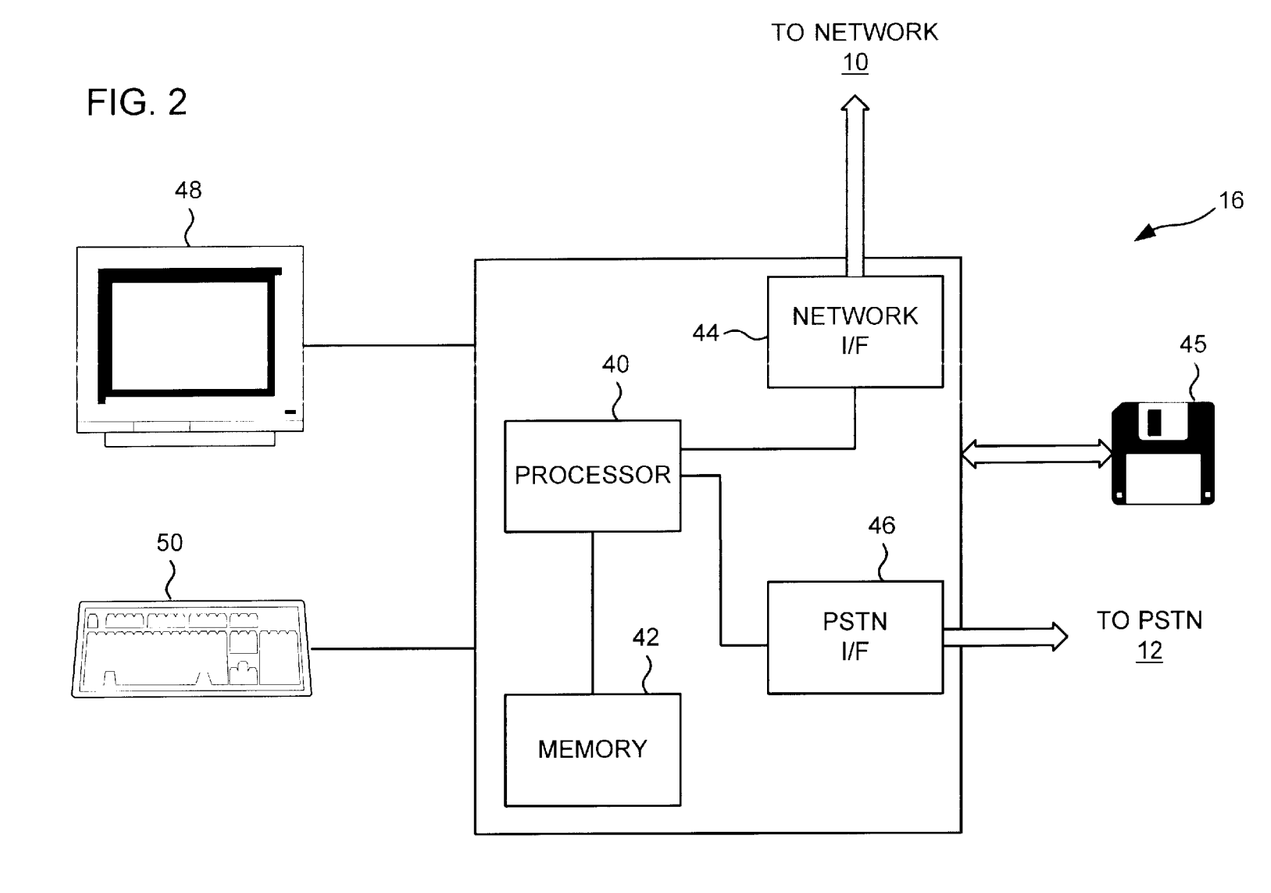
FIG. 2 is a block diagram of an architecture of a gateway of FIG. 1.

An exemplary architecture of gateway 16 is illustrated in FIG. 2. Gateway 16 is typically a conventional server suitable computing device. Gateway 16 may for example be a SUN Sparc server; a Microsoft NT Server; a Hewlett Packard HPUX server, or the like. Gateway 16 comprises a processor 40, in communication with persistent storage memory 42, and data network interface 44 and a PSTN interface 46. As well, gateway 16 may comprise a display 48 and input device 50, such as a keyboard, mouse or the like.

Processor 40 comprises a conventional central processing unit, and may for example comprise a microprocessor in the INTEL x86 family. Of course, processor 40 could be a RISC based CPU; a Motorola CPU, or any other suitable processor known to those skilled in the art. Persistent storage memory 42 comprises a suitable combination of random access memory, read-only-memory, and disk storage memory used by processor 40 to store and execute programs adapting the gateway 16 to act as an internet message server and gateway, as detailed below. Persistent storage memory 42 may include a device capable of reading and writing data to or from a computer readable medium 45 used to store software and data to be loaded into memory 42. Network interface 44 comprises any interface suitable to physically link gateway 16 to network 10. Interface 44, may for example be an Ethernet, ATM, or ISDN interface or even a modem that may be used to pass data, in the form of packets from and to the remainder of network 10. As noted, interface 44 is preferably a T1 or fractional T1 interface. PSTN interface 46 is preferably an ISDN primary rate interface ("PRI") comprised of PSTN access card supporting the appropriate PRI standards, available from for example, Dialogic Corp. of Parsippany, N.J., 07054, or Brooktrout Technology Inc. of Needham, Mass., that receives calls and extracts caller information and passes this to processor 40, as detailed below.

Figure 3:
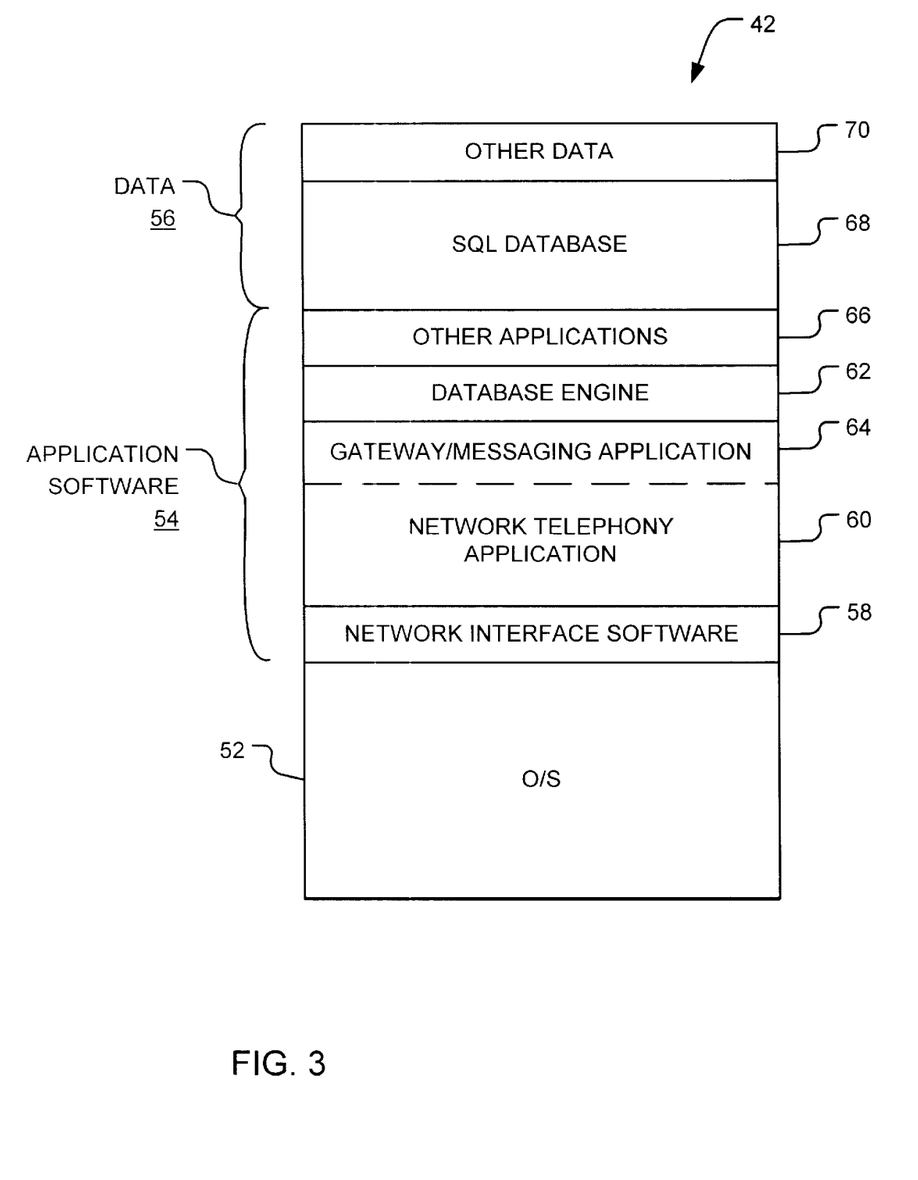
FIG. 3 illustrates an organization of memory of the gateway of FIG. 2.

The organization of persistent storage memory 42 of gateway 16 is illustrated in FIG. 3. Stored within memory 42 are computer software programs and data that are loaded into working memory of gateway 16 permit gateway 16 to be operable as a message server. As illustrated, memory 42 stores operating system software 52; application software 54; and data 56. Operating system software 52 may, for example, be Microsoft™ NT Server operating system software, UNIX operating system software, or the like. Application software 54 includes network interface software 58, which typically includes an internet protocol suite allowing communication of gateway 16 and thus operating system 52 with network 10, through physical data network interface 44 (FIG. 2). Application software 54 further comprises a network message server and gateway application 64, including a data network telephony application 60.

Preferably, and in addition, forming part of application software 54 is a database application or engine 62, such as for example a structured query language ("SQL") database engine capable of retrieving, updating, deleting and otherwise operating on records stored within a database 68. Database 68 stores records representative of end-users served by gateway 16 in accordance with the present invention. Other applications 66 and data 70 may also be stored within memory 42. As will be appreciated application software 54 may be formed by standard programming techniques known to those skilled in the art.

Figure 4:
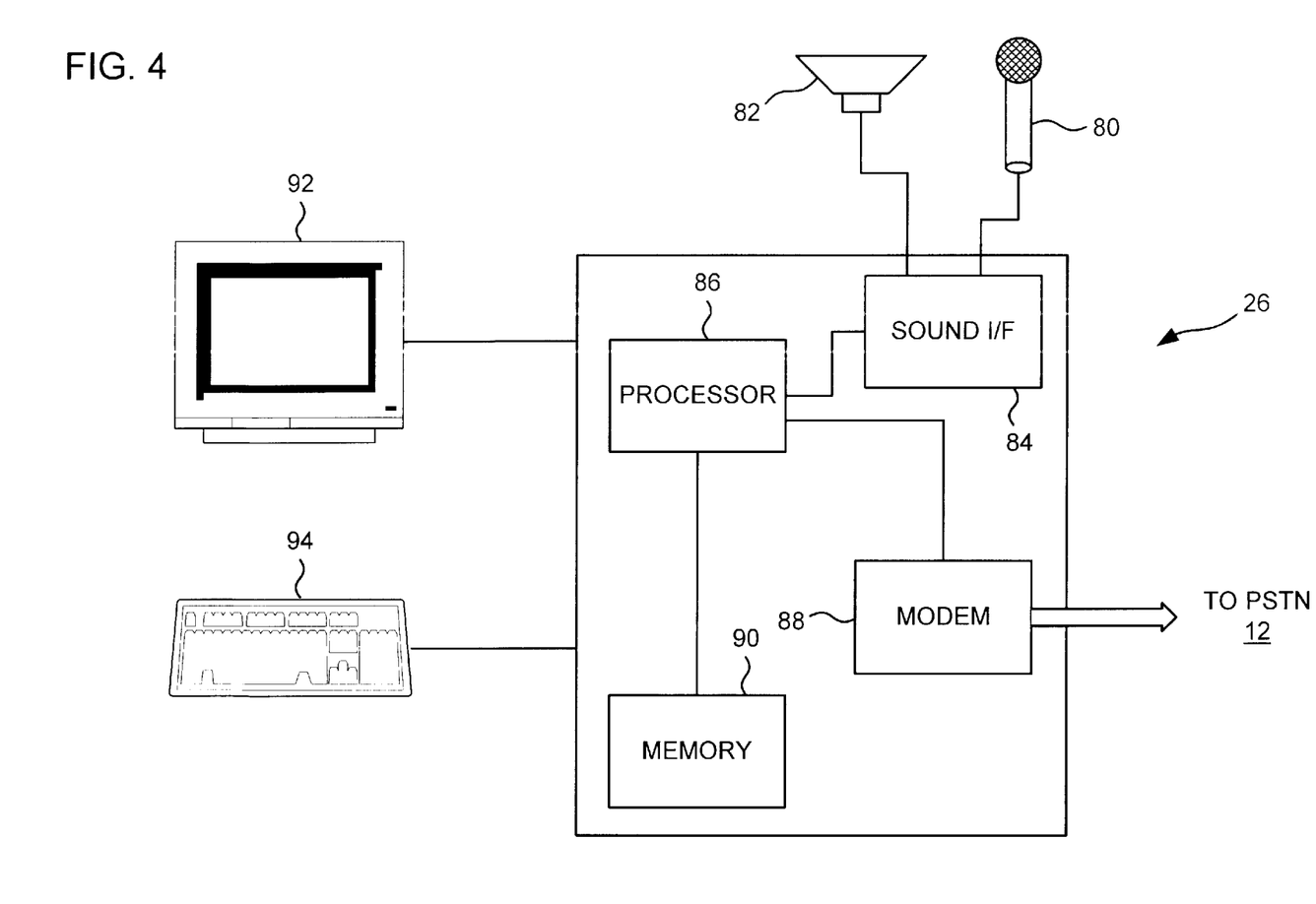
FIG. 4 illustrates an architecture of an end-user computing device, illustrated in FIG. 1.

FIG. 4 illustrates, in block diagram, the architecture of computing device 26 used by an end-user. Computing device 26 is a typical home or office computer comprising a processor 86, in communication with persistent memory 90, a network interface such as modem 88, a display 92, an audio interface 84; microphone 80 and typically at least one input device 94. Processor 86 is a typical central processing unit and may be a processor in the INTEL x86 family. Persistent memory 90 preferably comprises a hard drive, RAM and ROM memories. Modem 88 is typically a conventional telephone modem such as for example a U.S. Robotics™ Sportster™ or equivalent modem. Audio interface 84 is interconnected with speaker 82 and microphone 80. Audio interface 84 may be a conventional computer sound card including an analog to digital, and digital to analog converter allowing sampling of sound through a microphone 80 and replay of sound through speaker 82.

Figure 5:
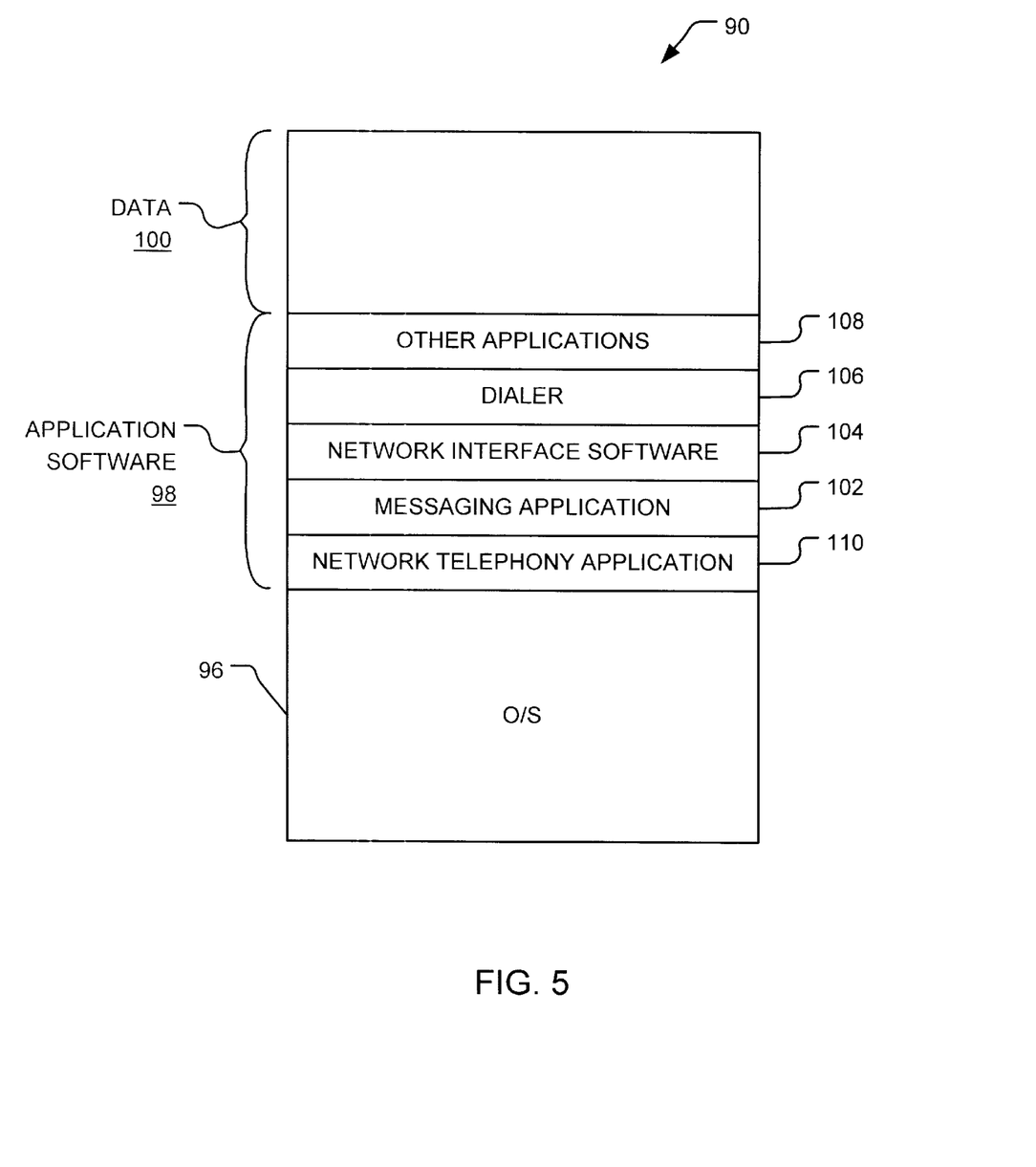
FIG. 5 illustrates an organization of memory of the device of FIG. 4.

The organization of persistent storage memory 90 of device 26 is illustrated in FIG. 5. As with memory 42 of gateway 16, stored within memory 90 are computer software programs and data that are loaded into operating memory of device 26. These permit device 26 to be operable as an end-user work station. As illustrated, memory 90 stores operating system software 96; application software 98, and data 100. Operating system software 96 may, for example, be Microsoft™ Windows NT Workstation operating system software; Windows 3.1, 95 or 98 software; Apple System 7.5 operating system software; or the like. Application software 98 includes network interface software 104, which also typically includes an internet protocol suite allowing communication of computing device 26 over modem 88 (FIG. 5) and thus operating system 96 with network 10 (FIG. 1). Application software 98 further comprises a modem dialer 106 that operates modem 88 to establish temporary connections to data network 10 via PSTN 12, as detailed below. Application software 98 additionally comprises messaging application 102 and network telephony application 110. Application software 98 may further comprise end-user applications 108 such as an internet browser, and other applications otherwise employed by the end-user and operator of device 26. Again, application software 98 may be formed using conventional programming techniques known to those skilled in the art.

Telephony applications 60 (FIG. 3) and 110 (FIG. 5) may for example comprise Microsoft™ Netmeeting™ software, available from Microsoft Corp. of Redmond, Wash., that enables voice over internet protocol communication ("VOIP"), as for example detailed in Internation Telecommunications Union ("ITU") Recommendation H.323, the contents of which are hereby incorporated by reference.

With reference to FIG. 1, in operation, an end-user at device 26 "registers" with gateway 16 in order to obtain service from gateway 16. An example registration process is detailed in U.S. patent application Ser. No. 09/144,111 entitled, Network Interconnected Computing Device, Server, and Notification Method, filed concurrently herewith and naming Carl Potvin as inventor, the contents of which are hereby incorporated herein by reference.

At a later time, the end-user at device 26 establishes an internet connection through PSTN 12. An internet connection is typically established through PSTN 12 by running or launching dialer application 106 at device 26; establishing a PSTN circuit between computing device 26 and ISP 18; and establishing a data connection between modems at bank 38 of ISP 18 and device 26. Once the data connection is negotiated and established, ISP 18 prompts computing device 26 for an identifier and/or password using conventional software (not illustrated) stored at ISP 18. Dialer 106 typically provides such an identifier and/or password. Upon successful provision of a password and identifier, ISP 18 and computing device 26, next, negotiate an IP link to computing device 26. This link may, for example, be established by a serial line internet protocol ("SLIP") or a point-to-point protocol ("PPP") IP connection between device 26 and ISP.

As part of establishing this IP link between computing device 26 and ISP 18, ISP 18 may assign a temporary "session" IP address to the computing device 26. This session IP address now uniquely identifies computing device 26 on network 10 and allows IP packets to be directed to computing device 26 during this session. Device 26 may register with gateway 16, by providing gateway 16 with an indication over network 10 using the known IP address of gateway 16, that computing device 26 is network interconnected ("on-line"), and the session IP address of device 26, as detailed in the above U.S. patent application Ser. No. 09/144,111 filed concurrently herewith, and naming Carl Potvin as inventor. This session network address is preferably stored within memory 42 of gateway 16. Alternatively, the session network address of device 26 may be provided to gateway 16 using the known ITU H.323 Recommendation.

Once the end-user device 26 has registered with gateway 16, IP packets containing data may be forwarded by gateway 16 to the end-user device 26, using the session IP address stored at gateway 16. As will be appreciated by those skilled in the art the packets may, for example, be directed to a logical network port, so that the packets are processed and interpreted by messaging application 102 and telephony application 110 executing at device 26 (FIGS. 4–5).

In an exemplary embodiment, gateway 16 acts as an internet call waiting server and gateway. Gateway 16 forwards messages over network 10, to end-users such as the end user at device 26 indicating PSTN callers attempting to reach an end-user at device 26 whose PSTN line is occupied as a result of the internet connection through telephone line 34. Specifically CO 32 provides the known call forward busy ("CFB") service, redirecting calls directed to the PSTN dial number of telephone 28 to another programmable number. CO 32 is preferably pre-configured so that the CFB feature for end-user at device 26 redirects calls to PSTN interface 46 of gateway 16 by way of CO 20, in the event that telephone line 34 is busy or in an off-hook state. Calling number information associated with the call, including the called number and a caller's phone number and name, is also passed to interface 46 of gateway 16, where it may be processed by processor 40.

Figure 6A:
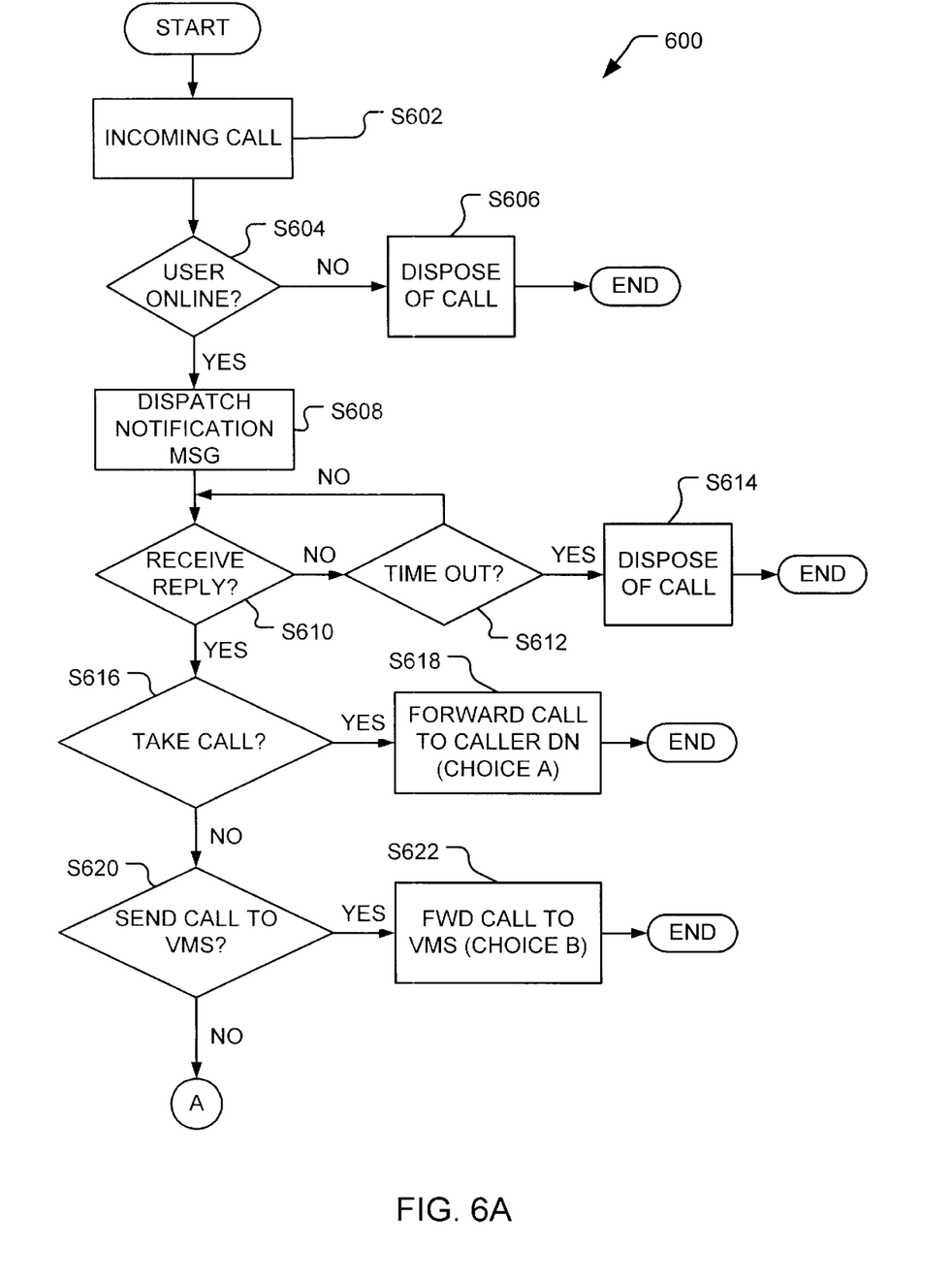
FIGS. 6A, 6B and 7 illustrate steps in methods exemplary of embodiments of the present invention.
Figure 6B:
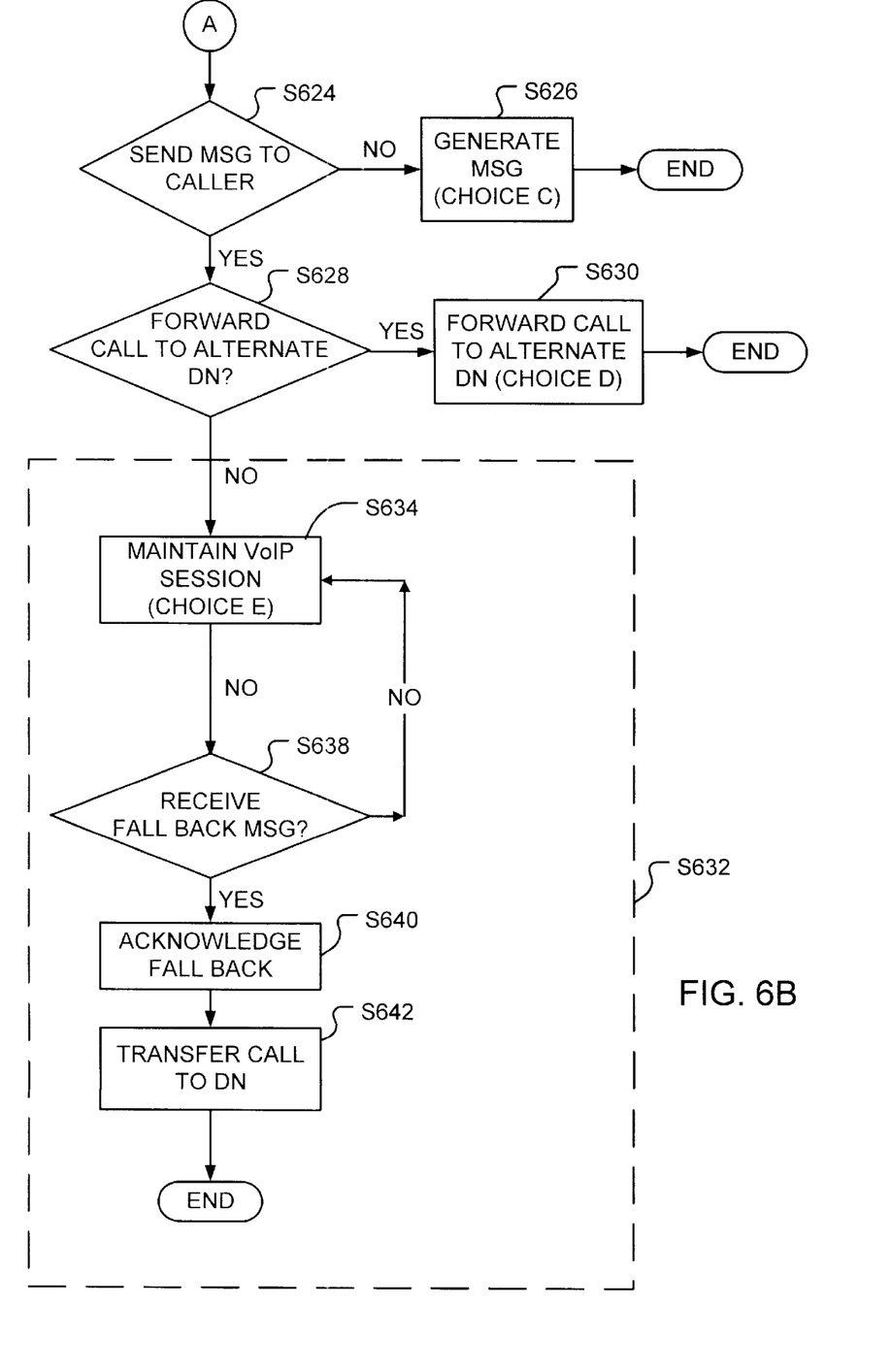
Figure 7:
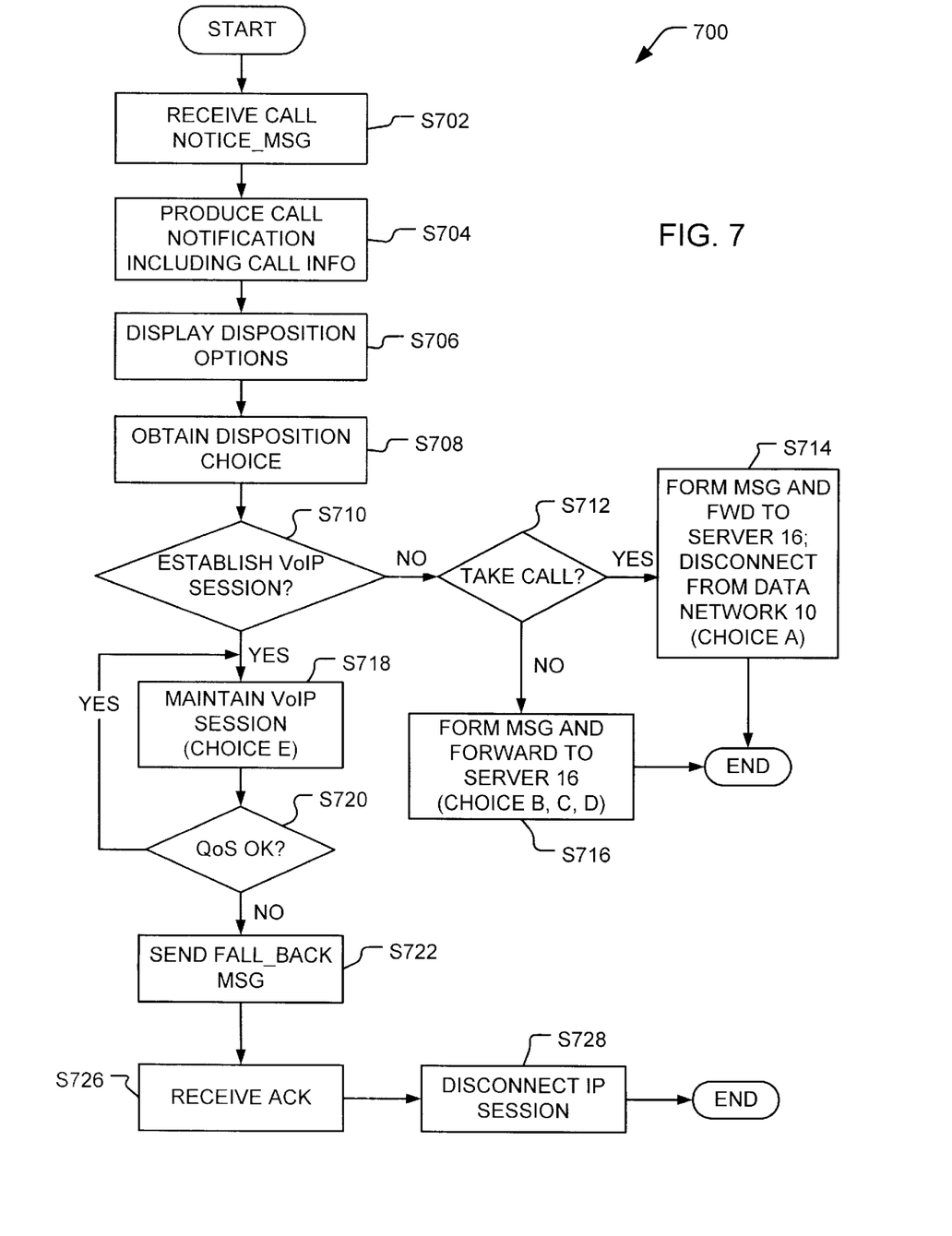

Exemplary steps 600 performed by gateway 16 if PSTN subscriber 39 attempts to call an end-user over line 34 while line 34 is in use to connect device 26 to ISP 18 are illustrated in FIG. 6. Exemplary steps 700 performed at device 26 are illustrated in FIG. 7. As illustrated, the call, forwarded by CO 32 to interface 46 of gateway 16 is received in step S602. Upon receipt of such a call, gateway 16 holds the call at interface 46. Gateway 16 also compares the called number with DN entries in database 68. If a corresponding end-user is not "on-line" the call may be forwarded to a voice mail system (not shown) or network busy tone.

If a corresponding end-user is "on-line", as determined in step S604, gateway 16 dispatches a notification message in step S608 indicating that a caller such as subscriber 39 is attempting to dial the busy telephone line 34, as well as an indicator of the calling number over network 10 to computing device 26, using the session network address for computing device 26, stored within memory 42. The notification message may, for example, be dispatched using a low latency network protocol as disclosed in U.S. Pat. No. 09/144,111 entitled "Enhanced Network Protocol" filed concurrently herewith, naming Marc Carrier as inventor, the contents of which are hereby incorporated herein by reference. The notification message is received at device 26 in step S702 (FIG. 7) and causes messaging application 102 to produce a user perceptible indicator at device 26 in step S704. The indicator may be an audible sound generated at speaker 82, and/or a visual indicator at display 92. The visual indicator may contain information about the incoming call, including caller ID information. As well, application 102 may cause a number of end-user call disposition choices to be presented at display 92 (FIG. 3) of device 26 in step S706. These end-user disposition choices may include the following:

A. disconnect network connection and accept call over the
B. send call to network voice mail system;
C. send pre-recorded message to caller;
D. forward call to alternate DN; and
E. accept call as voice over IP call.

In response, the end-user may select one of the presented choices to process the call, to application 102 in step S708.

Device 26 forms an appropriate response message which is forwarded to gateway 16 using network 10 and for example, the above described low latency protocol, as detailed below. Gateway 16, processes the call in accordance with the response message received from device 26. If a response is not received by gateway 16 within a specified time as determined in step S610 and S612, the call is disposed of by, for example, being forwarded to another network resource such as a voice mail system or a network busy tone, in step S614.

If the end-user selects choice A., as determined in steps S710 and S712, device 26 dispatches an appropriate message to gateway 16, preferably waits for acknowledgment of the message, and then disconnects the PSTN internet connection in step S714. Gateway 16, receives the message and in turn, in steps S616 and S618 uses interface 46 to forward the call to the end-user DN thereby establishing a PSTN circuit with the end-user's PSTN line 34 and causing handset 28 to ring. If the call is not accepted by the end-user it is disposed of by CO 32 in a conventional manner.

If the end-user selects choice B., device 26 forwards an appropriate message to gateway 16, in step S714. Gateway 16, in response, forwards the call directly to the end-user's voice mail server ("VMS") (not illustrated) in steps S620 and S622 where the caller 39 is prompted with the usual options to leave a message that may later be heard by the end-user. Of course, this option is typically only available if the end-user subscribes to network voice mail services.

If the end-user selects choice C., device 26 dispatches an appropriate message over network 10 to gateway 16 in step S716. Gateway 16, in response in steps S624 and S626 generates a pre-selected voice message over interface 46 to the caller. As will be appreciated, the pre-selected message may be pre-recorded or synthesized and is typically stored within memory 42. Thereafter, gateway 16 will typically disconnect the call.

If the end-user selects choice D., device 26 dispatches an appropriate message over network 10 to gateway 16 in step S714. This message may include an alternate PSTN DN that was previously input by the end-user at device 26. Alternatively, an alternate PSTN DN may be stored at gateway 16. In any event, upon receipt of the message at gateway 16 as determined in steps S628 and S630, gateway 16 establishes a connection with the alternate PSTN DN and forwards the call held at interface 46 to this DN in step S630. Once forwarded to the alternate DN, the call is processed in a conventional manner.

If the end-user selects choice E., as determined in step S710, gateway 16 in steps S632 initiates and maintains an internet telephony session with device 16 using network telephony application 60 by bridging the call on hold at gateway 16 with device 26 under control of application 110. Device 26, in turn initiates an internet telephony session using application 110 in step S710. The end-user at device 26 is now able to conduct a voice telephony session with caller 39, via gateway 16 and data network 10 using microphone 80 and speaker 82 (FIG.4).

If choice E. is selected, and as will be appreciated by those skilled in the art, telephony applications 60 and 110 at gateway 16 and device 26 exchange voice data by sampling speech and thereafter encoding this sampled speech into data using a known voice compression algorithm, such as for example, those compression algorithms detailed in ITU recommendations G.721, 722, 723.1, 728 or 729 in compliance with ITU recommendation H. 323. The encoded data is encapsulated in IP compliant packets and exchanged over network 10 in steps S718 and S632. Once received, the data is extracted by application 60 or 110, decompressed and preferably replayed by processor 40 or 86 at PSTN interface 46 or audio interface 84. In order to ensure real-time communication over network 10, applications 60 and 110 typically utilize the uniform datagram protocol ("UDP/IP"), as detailed in RFC 768 in order to exchange packets containing the voice data over network 10. As UDP/IP does not ensure delivery of packets, nor correct ordering of delivered packets, packets may be (and typically are) lost. This packet loss results in decreased voice quality in the bridged call between caller 39 and the end-user at device 26. Delays in packet transmission result in similar decreased voice quality. If too many packets are lost or delayed the voice quality of the bridged call becomes unacceptable. Alternatively, even if a reliable network protocol that ensures delivery of packets (such as the transmission control protocol ("TCP/IP") detailed in RFC 793) is used, network delays may result in unacceptable voice quality. The particular threshold at which the voice quality becomes unacceptable will typically vary depending on the compression algorithm used, and the perception of the end-user.

Accordingly, in step S720 telephony application 110 and/or messaging application 102 at device 26 may monitor the number of packets that are lost. Alternatively or additionally, messaging application or gateway application 64 could monitor the number of lost packets and periodically provide an indicator of this number to device 26. Messaging application 102 may further display a measure of the number of lost packets on display 92 at either device 26 or server 16. This may be particularly useful, as the number of lost packets lost at device 26 and lost at server 16 may differ. An end-user at device 26 may therefore not be aware of a deterioration of call quality, perceived by a caller such as PSTN subscriber 39. If the number of lost packets/unit time at either server 16 or device 26 exceeds a predefined threshold, application 110 could optionally automatically cause the call to fall-back to the PSTN 12. Similarly, if the number of packets/unit time falls below a pre-defined threshold, as a result of delays, application 102 or 110 could cause the call to fall-back to the PSTN 12. That is, application 64 reroutes the bridged call and routes the call over PSTN 12.

Specifically, in causing a bridged call to "fall-back" to the PSTN 12, messaging application 102 sends a "fall-back" message indicating it wishes to initiate a PSTN fall-back to gateway 16 in step S722. Gateway 16, receives the fall-back message in step S638, and discontinues maintaining the VOIP session in step S636 and acknowledges receipt of the fall-back request in step S640. This acknowledgment is received at device 26 in step S726. Device 26, under control of messageing application 102, in turn generates another audible or visible notification of the acknowledgement. Thereafter, device 26 may automatically disconnect the PSTN connection to ISP 18 in step S728. Alternatively, an end-user at device 26 may initiate the disconnection through application 102 or otherwise, in response to the notification.

At about the same time, gateway 16 maintains the call at PSTN interface 46 on hold. Optionally, gateway 16 may play an audible message to PSTN subscriber 39 advising that the call is being transferred. This message may also be stored in memory 42 of gateway 16. Gateway 16 then initiates a PSTN connection to the DN of line 34 using the original called party information accompanying the incoming call, and transfers the call to the hand-set of the end-user who may, in turn continue the call in step S642.

Specifically, server 16 preferably waits four seconds and then initiates a new call to line 34. By that time messaging application 102 at device 26 has likely received the acknowledgment to its fall-back message and has disconnected line. Preferably, the new call from server 16 to line 34 includes the calling number of the subscriber call, the called number of line 34, as well as optional redirection signalling information. When the call arrives at CO 32 line 34 may be busy or idle. If the line is idle, the new call will terminate and server 16 will receive an indication that the phone is ringing. The subscriber call is then bridged with this new call and will thus be able to speak with the end-user at line 34.

If line 34 has not been disconnected for device 26, typically because application 102 has not released line 34, the new call will encounter a busy line 34. This may occur, for example, because of device 26 or due to delays arising from delayed or lost packets before successful delivery of the acknowledgement. As line 34 is subject to the CFB feature, the call is redirected toward the server 16. By matching the signaling information received with the forwarded call with call state data for the subscriber (also optionally maintained within memory 90), the server may identify that this is not a new call for the subscriber but a call that "bounced". It therefore releases the new call. The subscriber call is returned to PSTN interface 46 from which it originated. Server 16 then again waits four (4) seconds and re-attempts. This process is repeated a number of times or for a set duration before abandoning or until the subscriber hangs-up. If all attempts are unsuccessful, the call is routed to an announcement, produced for example at server 16, indicating that the subscriber at line 34 is not available or to the subscriber's network voice mail server.

As an enhancement, in some PRI signaling protocols, server 16 can indicate that calls made should be cleared if they encounter further redirections (e.g., such as would occur by encountering CFB). This is, for example, possible with the DMS-100 NI-1 PRI protocol. When this protocol is used, server 16 performs this request. If line 34 is busy, the call is not forwarded to server 16 but is cleared towards the server 16. Using the signaling information received, server 16 may detect this condition and initiate the four (4) second delay prior to re-attempting. This has the advantages of reducing the network and server resources required during the re-attempt process.

As will be appreciated the described substeps forming part of step S642, used to route a call to line 34 could similarly be used to transfer a call in response to choices A, or D.

Alternatively, the call could be routed to an alternate DN after the PSTN fall-back is initiated. This DN might be the DN of the end-users voice mail system, or a DN contained in the message used to initiate the fall-back.

In an alternate embodiment, the above described fall-back method could additionally or alternatively be used with voice over IP initiated calls, if telephony applications 60 and 110 facilitated such outgoing voice over IP calls. That is, for example, if after an end-user at device 26 established an internet session with ISP 18 and wished to place a call to a PSTN line of subscriber 39, application 60 could send appropriate signalling information to server 16 directing application 110 and server 16 to initiate a PSTN call to dial number of subscriber 39; initiate a voice over IP call at application 60 and device 26; and then bridge this PSTN call with the device 26. Thereafter, applications 60 and 110 could optionally monitor the quality of the bridged call and allow an automated or end-user initiated fall back to the PSTN, as described above with reference to steps S632 and S718 to S728. Server 16, would accordingly place the call connection to the PSTN line of subscriber 39 on hold, initiate a call to the subscriber at line 34, and thereafter transfer the call on hold to line 34.

From the above description, it will be appreciated that device 26, ISP 18 and gateway 16 are all preferably independently operated. As will be appreciated, however, ISP 18 and gateway 16 could be co-located.

Further, while in the described embodiments, the gateway 16 performs call bridging and data network messaging, a person skilled in the art will appreciate that these functions need not be performed by a single device. Instead, the gateway 16 might only receive an indicator of a call at the telephone network. Similarly, the gateway 16 might be in communication with another network connected device that bridges the incoming call over the data network, and another network connected device that signals end-user device 26 of the incoming call received at the gateway 16.

While the above embodiment has been described in the context of a temporary connection to network 10 using the PSTN 12, a person skilled in the art will appreciate that the described embodiments could easily be modified to accommodate other temporary or permanent data network connections, by way of, for example a wireless network, an ISDN connection, an asynchronous digital subscriber line ("ADSL") connection, or another connection known to those skilled in the art. In such a modified embodiment, a telephone call would not necessarily be transferred to the same telephone line used to establish the internet connection, but would be transferred to a PSTN line elsewhere, and preferably proximate the end-user. As well, while the above embodiment has been described with reference to a single end 5 user, a person skilled in the art will appreciate that gateway 16 will typically provide similar services to a large group of end-users. As will be further appreciated, gateway 16 could be used in association with an advanced intelligent network ("AIN"). As such, an AIN redirection service could be used instead of the described CFB feature.

Additionally, while the organization of software and data components at device 26 and gateway 16 has been illustrated as clearly delineated, a person skilled in the art will appreciate that the delineation between applications, network interface software and operating system software is somewhat arbitrary. Other arrangements of such software are possible. For example, network interface software 104 and 58 may form part of operating system software 52 or 96. Similarly, while the embodiments have been described using the specific IP, and UDP/IP protocols other similar protocols, such as for example the IPX and SPX protocols could be used.

It will be further understood that the invention is not limited to the embodiments described herein which are merely illustrative of a preferred embodiments of carrying out the invention, and which are susceptible to modification of form, arrangement of parts, steps, details and order of operation. The invention, rather, is intended to encompass all modifications within its spirit and scope, as defined by the claims.

What is claimed is:

1. A method of providing a telephone call from a telephone network to a user proximate a computing device interconnected with a data network, said method comprising the steps of:
   a. receiving an indicator of said call at a gateway in communication with said data network and said telephone network;
   b. dispatching a notification of said call from said gateway for said computing device;
   c. bridging said call from said telephone network to said computing device using said data network, to form a bridged call that enables said user to communicate with said call using said computing device; and
   d. in response to a specified condition, forwarding said call to a telephone line interconnected with said telephone network, after step c.

2. The method of claim 1, wherein said call is received at said gateway.

3. The method of claim 1, wherein step c. is performed at said gateway.

4. The method of claim 3, wherein step c. comprises encoding voice signals associated with said call to form data transmitted across said data network.

5. The method of claim 1, wherein said condition in step d. comprises sensing quality of said bridged call is below an acceptable threshold.

6. The method of claim 1, wherein said specified condition comprises receiving a signal at said gateway from said computing device indicating said call should be forwarded to said telephone line.

7. The method of claim 6, wherein said signal is generated at said computing device in response to sensing quality of said bridged call is below an acceptable threshold.

8. The method of claim 7, wherein said data is transmitted across said network in packets; and wherein step d. further comprises the step of monitoring a number of lost packets between said gateway and said computing device.

9. The method of claim 8, wherein said network is an internet protocol network.

10. The method of claim 6, wherein said signal is generated at said computing device in response to end-user input.

11. The method of claim 1, wherein said sensing is performed at said gateway.

12. The method of claim 1, further comprising the step of receiving said message in step c. at said computing device and producing an audible or visual indicator perceptible by said user.

13. The method of claim 1, wherein said telephone line is in communication with a telephone proximate said computing device.

14. The method of claim 1, wherein said telephone line is in communication with a voice mail system.

15. A telephone network to data network gateway comprising:
   a processor;
   a telephone network interface in communication with said processor and said telephone network;
   a data network interface in communication with said processor and said data network;
   persistent storage memory in communication with said processor, said persistent storage memory storing processor executable instructions adapting said gateway to:
   a. receive a telephone network call at said telephone network interface;
   b. dispatch a notification of said call from said data network interface to a computing device over said data network;
   c. cause said call to be bridged from said telephone network to said computing device using said data network, to form a bridged call enabling a user at said computing device to communicate with said call using said computing device; and
   d. in response to a specified condition, cause said call to be forwarded to a telephone line interconnected with said telephone network, after said call has been bridged.

16. A method of operating an end-user computing device interconnected with a data network, said method comprising the steps of:

a. receiving an indicator of an incoming call at a telephone network over said data network;

b. communicating with said call at said telephone network by way of said data network using a voice telephony application; and c. in response to a specified condition, notifying said gateway to forward said call to a telephone line interconnected with said telephone network, after step b.

17. The method of claim 16, further comprising the step of d. producing at least one of an audible and visual indicator perceptible by an end-user at said end-user computing device.

18. A computing device comprising:

a processor;

a data network interface in communication with said processor and said data network;

persistent storage memory in communication with said processor, said persistent storage memory comprising processor readable instructions adapting said device to:

a. receive a notification of a call at said telephone network, at said data network interface;

b. communicate with said call at said telephone network by way of said data network using a voice telephony application; and c. in response to a specified condition, transmit an indicator to said gateway to transfer said call to a telephone interconnected with said telephone network, after communications with said call.

19. The device of claim 18, further comprising:

an audio interface for sampling voice signals at said computing device, and replaying voice signals received from said network, and associated with said call.

20. A data network to telephone network gateway comprising:

a. means for receiving an indicator of said call at a gateway in communication with said data network and said telephone network;

b. means for dispatching a notification of said call from said gateway for said computing device;

c. means for bridging said call from said telephone network to said computing device using said data network, to form a bridged call that enables said user to communicate with said call using said computing device; and d. means for forwarding said call to a telephone line interconnected with said telephone network in response to a specified condition.

21. A computer readable medium storing computer software that when loaded by a gate way comprising a telephone network interface, adapts said gateway to:

a. receive an indicator of said call at said gateway computer at said telephone network adaptor;

b. dispatch a notification of said call from said gateway computer for a computing device interconnected with a data network;

c. cause said call to be bridged from said telephone network to said computing device using said data network, to form a bridged call that enables a user at said computing device to communicate with said call using said computing device; and d. in response to a specified condition, cause said call to be forwarded to a telephone line interconnected with said telephone network, after causing said call to be bridged.

22. A method of processing a call comprising the steps of:

a. bridging said call between a telephone network and a computing device in communication with a data network, at a gateway in communication with said data network and said telephone network, to form a bridged call that enables a user to communicate with said call using said computing device; and b. in response to a specified condition, forwarding said call to a telephone line interconnected with said telephone network, after step a.

23. The method of claim 22, wherein step b. is performed at said gateway.

24. The method of claim 22, wherein said condition in step b. comprises sensing quality of said bridged call is below an acceptable threshold.

25. The method of claim 22, wherein said specified condition comprises receiving a signal at said gateway from said computing device indicating said call should be forwarded to said telephone line.

26. The method of claim 25, wherein said signal is generated at said computing device in response to sensing quality of said bridged call is below an acceptable threshold.

27. The method of claim 26, wherein said data is transmitted across said network in packets; and wherein step d. further comprises the step of monitoring a number of lost packets between said gateway and said computing device.

28. The method of claim 25, wherein said signal is generated at said computing device in response to end-user input.

29. The method of claim 24, wherein said sensing is performed at said gateway.

30. The method of claim 22, further comprising the step of receiving said message in step c. at said computing device and producing an audible or visual indicator perceptible by said user.

31. The method of claim 22, wherein said telephone line is in communication with a telephone proximate said computing device.

32. The method of claim 22, wherein said telephone line is in communication with a voice mail system.

* * * * *